(12) United States Patent
Chavez et al.

(10) Patent No.: US 7,097,196 B2
(45) Date of Patent: Aug. 29, 2006

(54) MODULAR AIRBAG HOUSING AND METHOD OF MANUFACTURE

(75) Inventors: Spencer William Chavez, Linden, MI (US); William Donald Tabor, IV, Clarkston, MI (US)

(73) Assignee: TK Holdings, Inc., Auburn Hills, MI (US)

( * ) Notice: Subject to any disclaimer, the term of this patent is extended or adjusted under 35 U.S.C. 154(b) by 0 days.

(21) Appl. No.: 10/305,637

(22) Filed: Nov. 27, 2002

(65) Prior Publication Data

US 2004/0100071 A1    May 27, 2004

(51) Int. Cl.
   *B60R 21/16*    (2006.01)
(52) U.S. Cl. .................................... 280/728.2
(58) Field of Classification Search ............ 280/728.2, 280/731, 732, 736, 740
   See application file for complete search history.

(56) References Cited

U.S. PATENT DOCUMENTS

| | | | | |
|---|---|---|---|---|
| 5,145,207 A | | 9/1992 | Bederka et al. ............. 280/732 |
| 5,470,105 A | | 11/1995 | Rose et al. .................. 280/740 |
| 5,474,323 A | * | 12/1995 | Davidson .................. 280/728.2 |
| 5,489,116 A | | 2/1996 | Boag ....................... 280/728.2 |
| 5,490,690 A | * | 2/1996 | Mihm ...................... 280/728.2 |
| 5,511,819 A | | 4/1996 | Spilker et al. ............ 280/728.2 |
| 5,673,930 A | * | 10/1997 | Coleman .................. 280/728.2 |
| 5,709,402 A | * | 1/1998 | Leonard ................... 280/728.2 |
| 5,775,730 A | | 7/1998 | Pripps et al. ............... 280/740 |
| 5,806,879 A | * | 9/1998 | Hamada et al. .......... 280/728.2 |
| 5,813,707 A | | 9/1998 | Bohn ....................... 280/728.2 |
| 5,857,696 A | * | 1/1999 | Inoue et al. .............. 280/728.2 |
| 5,899,485 A | * | 5/1999 | Folsom et al. ............ 280/728.2 |
| 5,931,491 A | | 8/1999 | Bosgeiter et al. ........ 280/728.2 |
| 6,109,649 A | | 8/2000 | Adomeit ..................... 280/740 |
| 6,120,057 A | | 9/2000 | Adomeit et al. ............. 280/731 |
| 6,123,358 A | | 9/2000 | Ryan et al. .................. 280/739 |
| 6,161,862 A | | 12/2000 | Rose et al. ............... 280/728.2 |
| 6,161,865 A | | 12/2000 | Rose et al. ............... 280/728.3 |
| 6,173,988 B1 | * | 1/2001 | Igawa ...................... 280/728.2 |
| 6,247,721 B1 | | 6/2001 | Lang ....................... 280/728.2 |
| 6,250,669 B1 | * | 6/2001 | Ohmiya ..................... 280/732 |
| 6,296,270 B1 | * | 10/2001 | Amamori ................. 280/728.2 |
| 6,364,345 B1 | * | 4/2002 | Lang ....................... 280/728.3 |
| 6,394,485 B1 | * | 5/2002 | Amamori ................. 280/728.2 |
| 6,435,541 B1 | * | 8/2002 | Thomas et al. .......... 280/728.2 |
| 6,616,176 B1 | * | 9/2003 | Uchiyama et al. ....... 280/728.3 |
| 6,709,005 B1 | * | 3/2004 | Amamori ................. 280/728.2 |

\* cited by examiner

*Primary Examiner*—Paul N. Dickson
*Assistant Examiner*—Laura B. Rosenberg
(74) *Attorney, Agent, or Firm*—Foley & Lardner LLP

(57) ABSTRACT

A modular airbag housing and a method for its manufacture are provided. The modular airbag housing is constructed from a plurality of pieces, including a plurality of plates, at least two of which are modular, and an inflator retainer. The housing has a plurality of tabs for attaching to the vehicle. Two hook plates having a plurality of hook members may be attached to the housing. The inflator retainer includes a first half and a second half. Both halves of the retainer include a substantially arcuate outer surface and at least one flange, a securing of the halves fixing a portion of an airbag therebetween. The second half includes a plurality of inflation orifices for directing inflation gas from an inflator unit into an airbag attached to the inflator retainer.

18 Claims, 3 Drawing Sheets

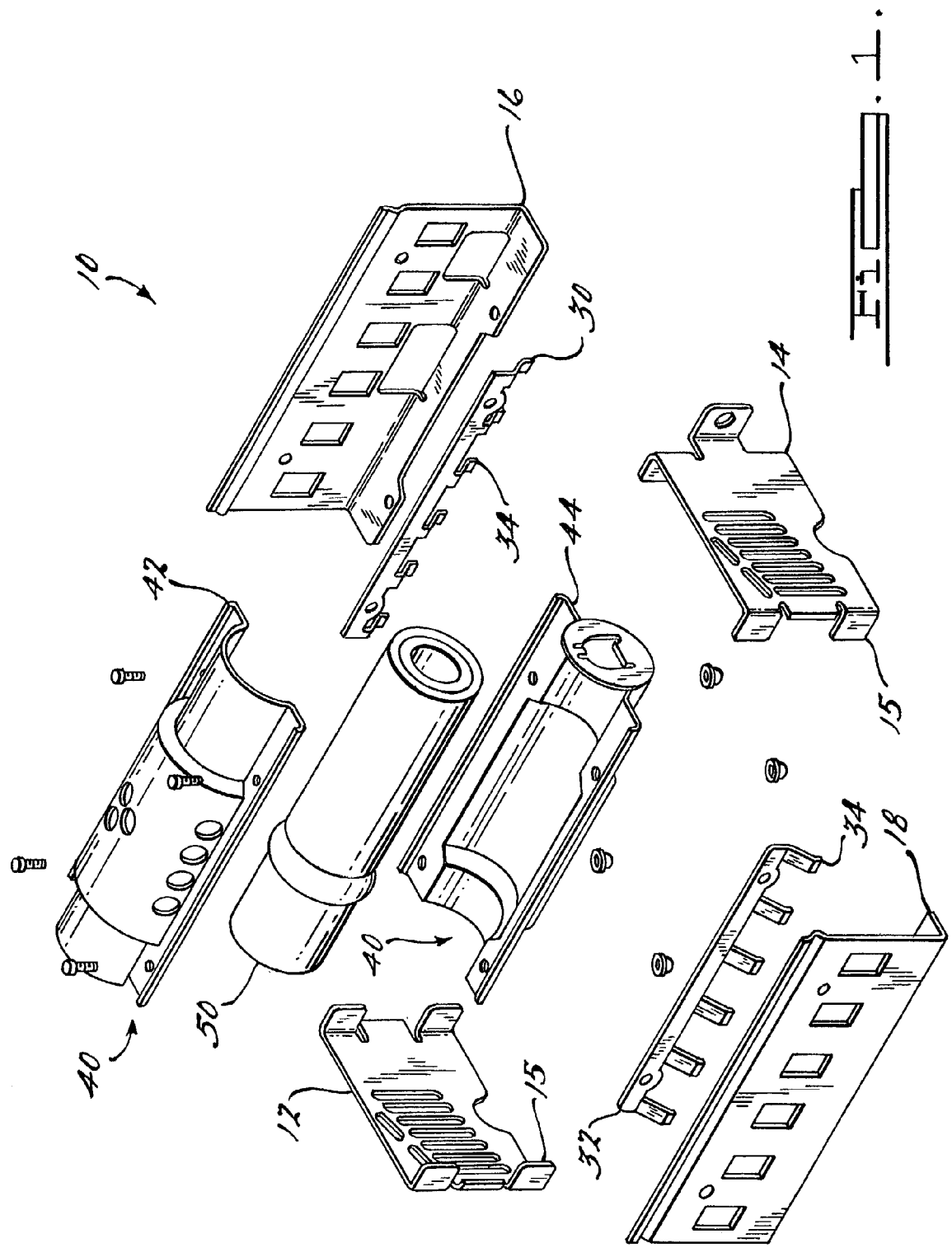

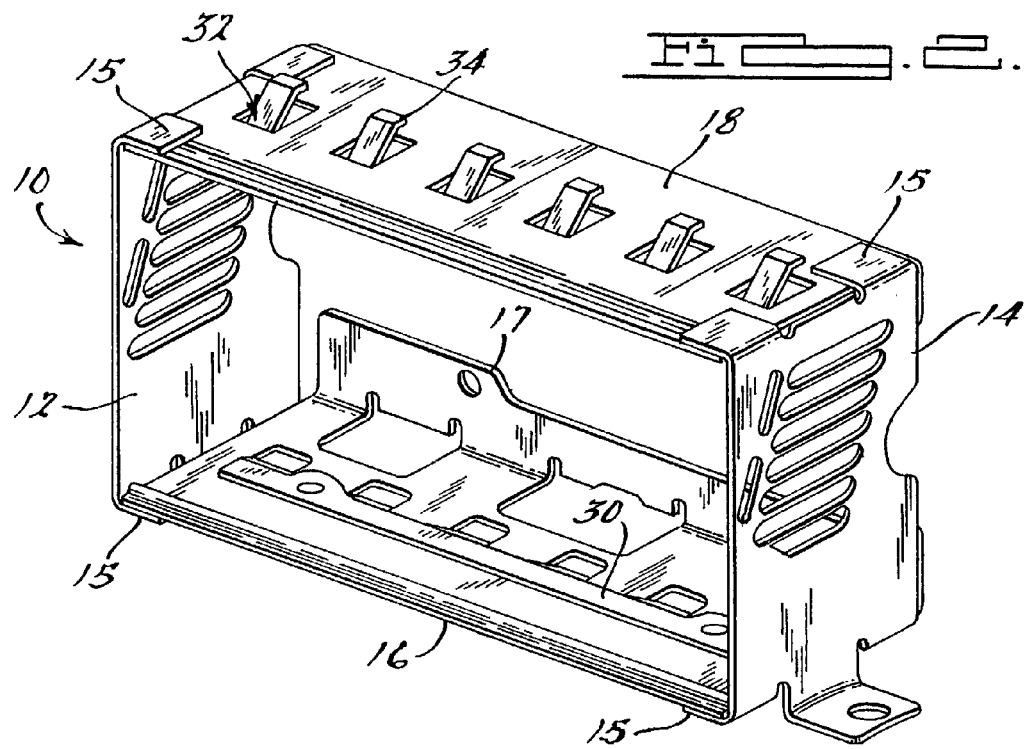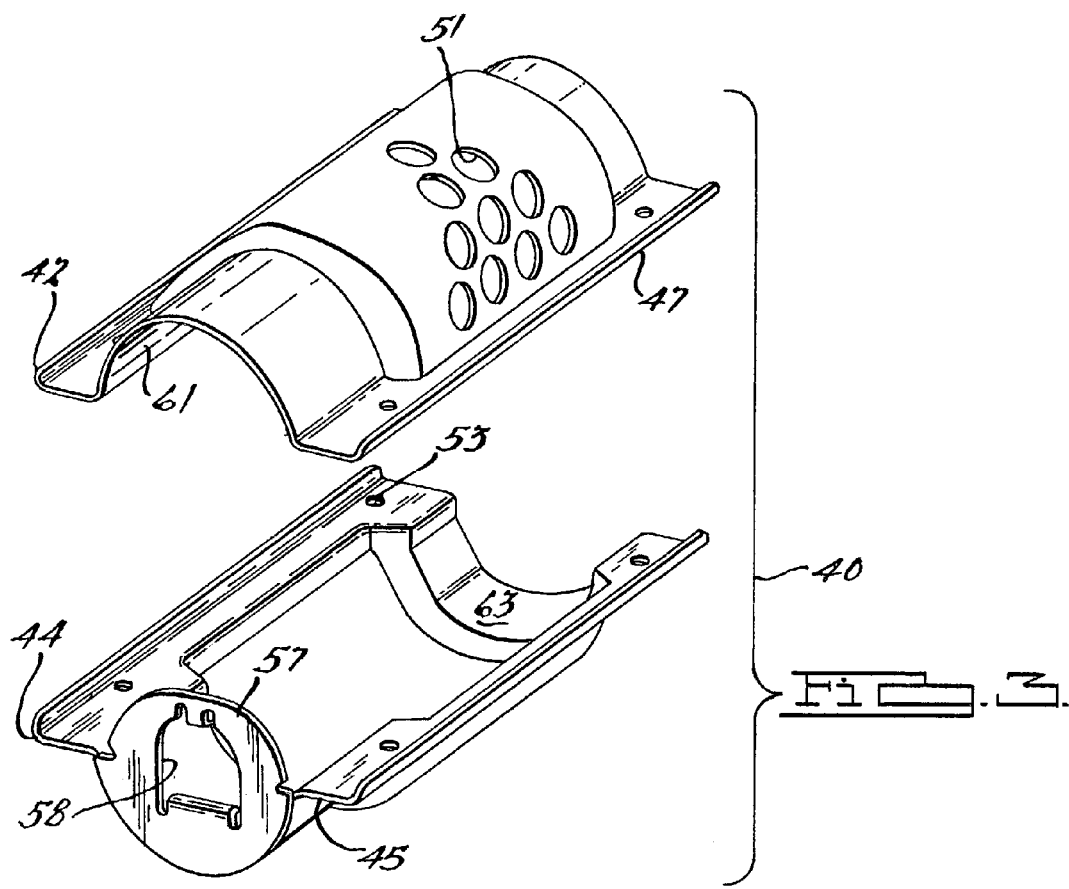

MODULAR AIRBAG HOUSING AND METHOD OF MANUFACTURE

TECHNICAL FIELD

The present invention relates generally to housings for vehicle inflatable restraint devices and methods for the manufacture thereof, and more particularly to such a housing having a plurality of modular members, and a method for its manufacture.

BACKGROUND OF THE INVENTION

A great variety of designs and manufacturing processes for airbag housings and related mounting hardware has developed over the years. Some of these housings provide specific mounting features for positioning and retaining the housing within a particular vehicle model, or class of vehicles. Similarly, a great degree of design specificity is often required for mounting and retaining various sub-components of the housing, for instance, the respective retainers for the inflator and for the airbag. Because of the strict sizing and design requirements, airbag housings generally do not enjoy a high degree of versatility. An airbag housing designed for particular sub-components may be unwieldy or even unusable in circumstances where different sub-components are desirable. Likewise, a housing intended for use in a sport utility vehicle, for example, may not be suitable for mounting in a compact car due to the differing dimensions of the vehicle structures.

Many airbag housings are manufactured by conventional stamping processes, in which the housing body is stamped and folded from a single piece or small number of pieces of metal plate stock. While the end product is relatively rigid, and simple to fully assemble, a significant amount of waste material can be produced from the large number and volume of stampings required. Additionally, it is often necessary to operate the equipment at relatively high tonnages, consuming substantial amounts of power. Moreover, retooling is often necessary where housings are to be manufactured to differing specifications, increasing both costs and equipment downtime.

The present invention is directed to one or more of the problems or shortcomings associated with the related art.

SUMMARY OF THE INVENTION

It is an object of the present invention to provide a modular airbag housing that is relatively simple to manufacture and versatile in size, configuration, and accommodation of varying airbag inflators.

In one aspect, a method of manufacturing an airbag housing is provided. The method includes the steps of positioning modular housing plates substantially parallel to each other, and positioning non-modular plates substantially parallel to one another and substantially perpendicular to the modular plates. The method further includes the steps of attaching the modular housing plates to the non-modular plates to form a walled housing body having an interior space, and attaching a two piece inflator retainer to the housing body within the interior space.

In another aspect, an airbag housing is provided that includes an inflator retainer attached thereto. The inflator retainer has a first half and a second half. The first half includes an outer surface having a flange extending therefrom. The second half includes an outer surface having a plurality of orifices penetrating therethrough and a second flange extending therefrom. Attachment of the first and second halves allows an inflator to be secured therein, and alignment of the flanges allows an airbag to be secured therebetween.

BRIEF DESCRIPTION OF THE DRAWINGS

FIG. 1 is an exploded view of a modular airbag housing assembly according to a preferred embodiment of the present invention;

FIG. 2 is a perspective view of a modular airbag housing body according to a preferred embodiment of the present invention;

FIG. 3 is a perspective view of first and second halves of an inflator housing according to a preferred embodiment of the present invention;

DETAILED DESCRIPTION

Figure 4:
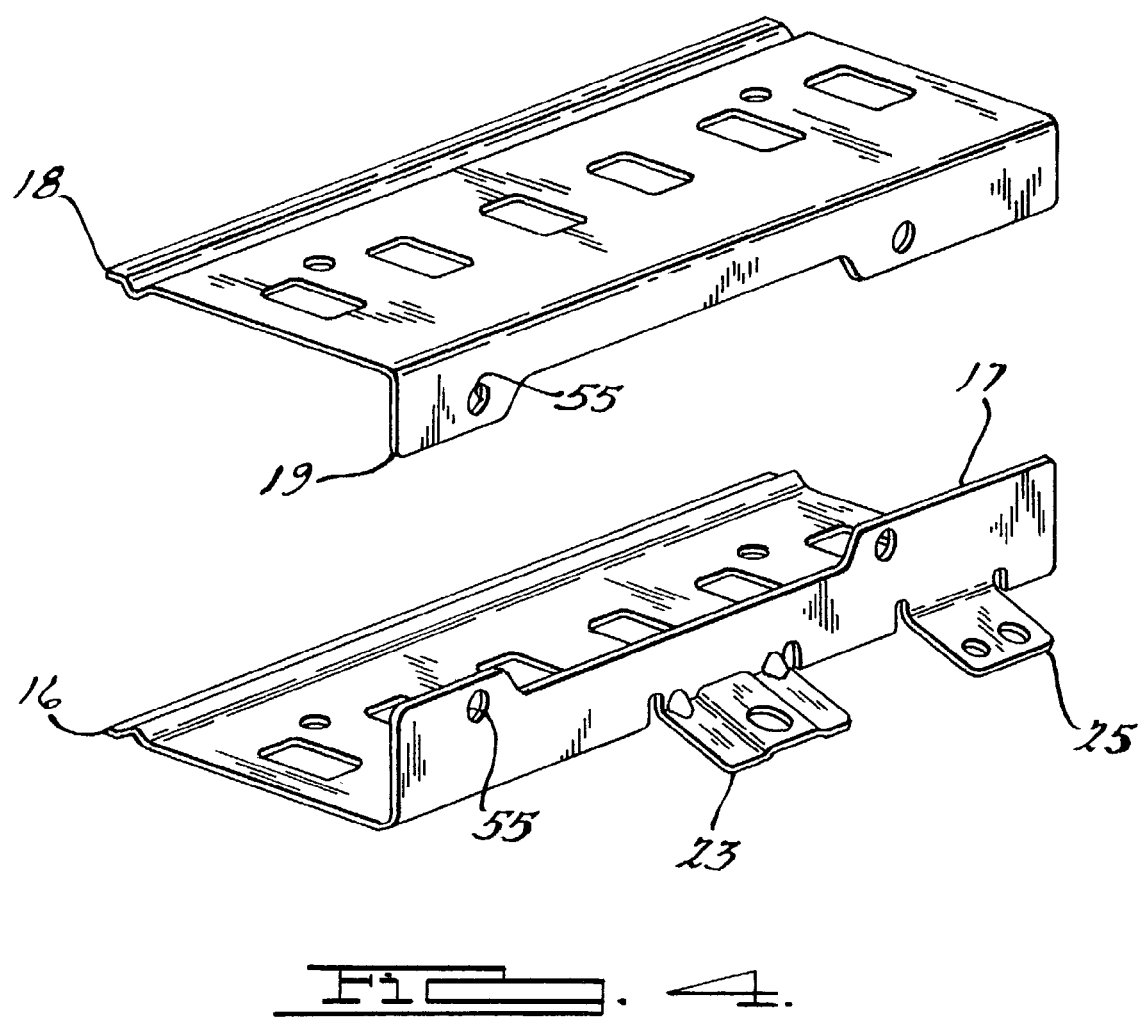
FIG. 4 is a perspective view of top and bottom side plates of a modular airbag housing according to a preferred embodiment of the present invention.

Referring to FIG. 1, there is shown an exploded view of a modular airbag housing assembly 10 according to a preferred embodiment of the present invention. Housing assembly 10 is preferably mounted in a vehicle dashboard, where it stores a folded airbag cushion that can be deployed toward a vehicle interior to protect an occupant in the event of a crash or sudden deceleration. Housing assembly 10 includes, for example, a first modular end plate 12 and a second modular end plate 14, which are preferably substantially similar in shape and construction. Housing assembly 10 further includes a first side plate 16, or lower plate, and a second side plate 18, or upper plate. The various housing plates utilized in the construction of the present invention are preferably substantially planar. The pieces need not be perfectly flat or smooth, however, in a preferred embodiment the housing plates arc formed with conventional metal stamping equipment, and for ease of processing as well as availability of starting material, substantially planar, flat pieces are preferred. All the components of housing assembly 10 are formed from known materials and by known processes. It should be appreciated that the present invention encompasses designs in which the end plates are modular and the side plates are non-modular as well as designs in which the side plates are modular and the end plates are non-modular. In a preferred embodiment, the modular set comprises a set of plates having substantially identical dimensions, whereas the non-modular set comprises plates having a wide range of dimensions. The modular set is adapted to accommodate, i.e. is compatible with, different plates selected from the non-modular set. Thus, a wide variety of airbag housings can be manufactured by utilizing modular end or side plates, and attaching the modular plates to sets of non-modular plates with different lengths, heights, widths, etc.

Housing assembly 10 preferably includes a two piece inflator housing 40 or inflator retainer having a first half 42 and a second half that are attachable to form a hollow retainer body that encloses a conventional airbag inflator 50. Inflator 50 can be any suitable known inflator, and is preferably a cylindrical metal inflator utilizing a non-azide gas generate composition. Two hook plates 30 and 32 are preferably provided, each including a plurality of hook members 34. In a preferred embodiment, the end plates 12 and 14 are attachable to side plates 16 and 18 to form a substantially rectangular, four-walled housing unit, with inflator housing 40 positionable therein. Attachment of end plates 12 and 14 to side plates 16 and 18 is facilitated by a plurality of attachment tabs 15, preferably located on end plates 14, 12, respectively. Tabs 15 are preferably formed integrally with their respective end plates, and extend substantially perpendicular to the face of the end plate. Stated another way, the tabs 15 are preferably punched or cast from the same piece of stock as the end plate to which they attach. It should be appreciated, however, that separate tab members might be welded to the end plates rather than forming the tabs integrally therewith. Further still, the end plates could be manufactured without tabs at all, and the housing members attached with tabs located on the side plates. The component parts of housing assembly 10 are all preferably metallic and constructed by stamping the various components in a manner well-known in the art, although they might be cast or formed by some other method without departing from the scope of the present invention.

Referring now to FIG. 2, there is shown a four-walled housing assembly 10 comprised of the end plates 12 and 14, and the two side plates 16 and 18. End plates 12 and 14 are preferably oriented substantially parallel to one another, with side plates 16 and 18 being likewise parallel to one another and substantially perpendicular to end plates 12 and 14. In a preferred embodiment, end plates 12 and 14 are positioned such that before respective sets of attachment tabs 15 overlay the outer sides of side plates 18 and 16, abutting the outer face of each side plate 16, 18, in a substantially flush manner. It should be appreciated, however, that the components might be positioned such that the attachment tabs 15 abut the inner face of each side plate 12, 14. During assembly, when the plates are thus positioned, spot welds can be placed at the tab-side plate interfaces to securely form the housing body illustrated in FIG. 2. It should be appreciated, however, that screws, rivets, or some other method of attaching the components of housing assembly 10 might be used without departing from the scope of the present invention. A mounting flange 17, preferably oriented substantially perpendicular to the face of plate 16, is preferably located on plate 16 and used to secure the inflator housing 40 to housing assembly 10, described below.

Hook plates 30 and 32 are also illustrated in FIG. 2 and are affixed to the upper 18 and lower 16 side plates, preferably with a plurality of screws and spot welds, though some other attachment method such as a continuous weld along a long axis of the hook plates might be used. Hook members 34 are shown protruding through a plurality of apertures 21 in upper plate 18, A second set of hook members (not shown) preferably extend through lower plate 16. Hook members 34 preferably engage vehicle structural members and assist in retaining housing assembly 10 against dislodging, particularly when the associated airbag is inflated, producing a recoil force on the module. The hook plates preferably employed are modular, allowing different sizes and hook configurations to be selected for different applications. An alternative embodiment is contemplated in which a plurality of hook members are formed integrally with housing assembly 10, rather than on separate plates. In such an embodiment, the hook members might be punched from the upper and lower plate pieces, for example.

Turning to FIG. 3, there are shown the two halves of inflator housing assembly 40. Inflator housing 40 is preferably formed as a modular unit attachable to airbag housing assembly 410, differing from some earlier designs wherein the inflator retainer was formed integrally wit the housing structure. The present invention provides a great deal of design flexibility. Different inflators are compatible with a single inflator retainer; however, the modular design of the inflator retainer and the airbag housing allows different retainers to be utilized with a selected housing design, further enhancing versatility of design. First half body member 42 and second half body member 44 preferably each have an are under outer surface, and thus form a hollow, roughly cylindrical body when attached. A set of flanges 45 and 47 are preferably located on both sides of each body member and extend in a generally perpendicular direction from the arcuate surface of each half. A plurality of holes 53 preferably penetrate through the flanges 45, 47, and can receive screws, bolts, or some other suitable attachment members to secure the two body members 42 and 44 together. In a preferred embodiment an airbag (not shown) is secured between the two body members 42 and 44, and thereby retained during inflation. The open end of the airbag is preferably positioned against the flange 45 on both sides of second half 44, then first half 42 can be positioned adjacent second half 44 and the two halves secured with screws to retain the end of the airbag. Flanges 45 and 47 are preferably shaped such that flange 45 "cups" flange 47 when first half 42 and second half 44 are secured together. Alternatively, the cupping relationship might be reversed, or it might be abandoned altogether and some other airbag retention means employed without departing from the scope of to present invention. Inflator housing 40 is preferably assembled and attached to its associated airbag during installation into airbag housing assembly 10, however, it might be assembled elsewhere, ten installed as a modular unit. Second half 44 includes a butt plate 57 with a central channel 58. Butt plate 57 preferably assists in retaining and positioning inflator 50 when it is mounted in inflator housing 40, allowing an electrical connection between inflator 50 and an automobile electrical system via channel 58 in a conventional manner.

In a preferred embodiment, an inflation gas diffuser is integral with inflator housing 40, and comprises a plurality of apertures 51 defined by first half 42, and providing fluid communications between the inside of the inflator housing 40 and the exterior. An inflator (pictured in FIG. 1) is preferably positioned in the hollow interior created by halves 42 and 44, and rapidly produces inflation gas when activated that is directed into an airbag through apertures Si. Apertures 51 throttle back the initial gas pressure supplied to the associated airbag, and direct the inflation gas to optimize the fill out of the bag upon inflation. Moreover, the airbag is isolated from the inflator, improving post-deployment cushion integrity. The configuration of the apertures 51 can be varied significantly from the illustrated configuration, and might be customized to better suit differing airbag deployment, folding, and design specifications. For example, by removing or adding punches to the manufacturing tool, a variety of different aperture configurations can be created. The present invention allows various inflator aperture designs to be tested. The apertures may for example be greater or lesser in number, or arranged in different patterns. Different aperture patterns can actually be tested, and the assembly tuned to specifications by selecting a preferred pattern based on test data related to airbag inflation rates, profiles, etc. Because apertures 51 are located on the arcuate outer surface of first half 42, they assist in uniformly and evenly distributing the inflation gas to the airbag.

The "clam shell" design of inflator housing 40 allows a great variety of inflators, having varying shapes and sizes, to be mounted therein. Referring to FIG. 1, inflator housing 40 accommodates inflators having different lengths, and thus containing greater or lesser quantities of gas generate composition, and having different activation characteristics, for instance single as well as multi-chamber inflators. Each portion of inflator housing 40 preferably has two arcuate inflator retaining surfaces (numerals 61 and 63 in FIG. 3). Thus, when the respective halves of inflator housing 40 are secured together, two sets of arcuate inflator retaining surfaces are brought into substantial opposition, forming two substantially cylindrical inflator seats in inflator housing 40. Because the inflator seats are preferably cylindrical, cylindrical inflators having varying lengths can be utilized. A relatively short inflator can be secured therein so long as it is long enough to engage the inflator retaining surfaces 61 and 63. Alternatively, a relatively long inflator can be positioned in inflator housing 40, allowing an end of the inflator to protrude from an end of the inflator housing 40. Thus, the disclosed design will find application in different vehicle models having different standard airbags, and different airbag module design requirements. For instance, in one application it may be desirable to deploy an airbag with a particularly high volume, necessitating a relatively large inflator. Other applications might incorporate smaller inflators for smaller volume airbags. By manufacturing the inflator housing 40 in such a way that it is capable of accommodating different inflators, the present invention imparts a considerable degree of flexibility to designers. Moreover, integrating the diffuser and the airbag retainer with the inflator housing simplifies the design and construction of the assembly.

Referring now to FIG. 4, there are shown upper 18 and lower 16 side plates. Upper side plate 18 preferably includes a substantially perpendicular flange 19, while lower plate 16 also preferably includes a substantially perpendicular flange 17. Flanges 17 and 19 are preferably integral with the plates to which they are attached, however, they might be formed 85 separate members welded to the plates, without departing from the scope of the present invention. Both flanges 17 and 19 preferably have a plurality of holes 55 for attaching of inflator housing 40. In a preferred embodiment, holes 55 can receive the same screw or bolt members (not shown) used to secure the two halves 42 and 44 of inflator housing 40 together. Upper and lower plates 16 and 18 both preferably include a plurality of apertures for receipt of hook members 34, although this design might be varied, as previously described. Two mounting tabs 23 and 25 are preferably attached to lower side plate 16 and are used to secure the entire assembly to a vehicle structural member, for example a cross-bar. Tabs 23 and 25 might be welded to lower plate 16 (or upper plate 18), or they might be formed integrally therewith. Furthermore, it not necessary that mounting tabs be positioned on the side plates 16 and 18 at all. In an alternative embodiment the mounting tabs might be located on the end plates as illustrated in FIGS. 1 and 2.

By providing modular housing component members, the present invention affords a significant degree of flexibility to designers, allowing the incorporation of a great many different inflators and inflator assemblies into housing assembly to. Standard modular members can be manufactured fur use with any number of different sized non-modular plates, allowing the production of airbag housings with different lengths, heights or widths without having to significantly alter tooling. In one preferred embodiment, a first set of modular housing plates having substantially identical dimensions, either end plates or upper and lower plates, is manufactured. A second set of non-modular housing plates having varying dimensions is also produced. When presented with particular structural and functional requirements, e.g. the size of inflator, dimensions of vehicle dash, etc., a designer can select the non-modular plates best suited for attachment with the modular plates to produce the desired housing units. In addition, the present design imparts a considerable degree of flexibility in mounting methods for the housing. Where rear support to the housing is desired, side plates having mounting tabs can be incorporated. Where rear support is unnecessary, side plates without the tabs can be used, and mounting may be undertaken with tabs on the end plates alone. This flexibility allows the housing to be mounted at multiple positions in the vehicle. For example, the housing may be positioned at the top of the instrument panel, at the front of the instrument panel, or even at a position at the underside of the instrument panel.

In earlier systems, the inflator housing was manufactured integrally with the airbag housing, and altering housing design required substantial changes in tooling, increasing production costs and production downtime. The present design allows the various components to be manufactured separately, and thus universal end plates could support side plates that have different inflator housings integral therewith, as well as those without an integral inflator housing at all, as in a preferred embodiment disclosed herein. Similarly, universal side plates could be used in conjunction with varying end plates. Additionally, the inflator housing is adapted to receive different sized inflators, and can be used to retain the airbag cushion. By increasing the number of component parts as compared to earlier designs, and producing modular pieces, a great degree of interchangeability is introduced into the manufacturing process. The modular plates can serve as the base for many different airbag housing units, and the present invention can be easily retrofitted for existing vehicle models. Lessening the complexity of manufacturing the housing provides a reduction in tonnage requirements for forming the various components, and results in significant cost savings over earlier systems wherein the entire housing had to be formed from one or two pieces of starting material. Furthermore, by forming the housing from multiple parts, the reduced stamping lessens the blank waste produced during the process, maximizing material utilization and further lessening cost.

It should be appreciated that the present description is for illustrative purposes only, and should not be construed to limit the breadth of the present invention in any way. Thus, those skilled in the art will appreciate that significant modifications could be made to the presently disclosed embodiments without departing from the intended spirit and scope of the present invention. Other aspects, features, and advantages of the present invention will be apparent upon an examination of the attached drawing figures and appended claims.

What is claimed:

1. A method of manufacturing an airbag housing comprising the steps of:

providing a first set of substantially planar modular housing members having substantially constant dimensions;

providing a second set of substantially planar housing members; and selecting two substantially similar housing members from the second set, and attaching the housing members from the second set directly to the modular housing members of the first set so that said housing members from the second set are relatively fixed with respect to said housing members from the second set;

attaching a first hook plate to a first member of the first set of housing members, wherein a plurality of hook members attached to the first hook plate protrude through a plurality of apertures in the first housing member of the first set of housing members; and attaching a second hook plate to a second member of the first set of housing members, wherein a plurality of hook members attached to the second hook plate protrude through a plurality of apertures in the second member, wherein the housing members from the first set are oriented substantially perpendicular to the housing members of the second set, thereby forming a substantially rectangular housing.

2. The method of claim 1 further comprising the step of attaching a two-piece inflator retainer to the housing, the inflator retainer adapted to accommodate inflators having varying dimensions.

3. A method of manufacturing an airbag housing comprising the steps of:

positioning first and second modular housing plates substantially parallel to each other;

positioning first and second non-modular housing plates substantially parallel to one another and substantially perpendicular to the modular housing plates;

attaching the modular housing plates directly to the non-modular plates so that said first and second modular housing plates are relatively fixed with respect to said first and second non-modular housing plates, thereby forming a walled housing body defining an interior space;

securing a two piece inflator retainer in the housing body at least partially within the interior space attaching a first hook plate to a first of the housing plates, wherein a plurality of hook members attached to the first hook plate protrude through a plurality of apertures in the first housing plate; and attaching a second hook plate to a second of the housing plates, wherein a plurality of hook members attached to the second hook plate protrude through a plurality of apertures in the second housing plate.

4. The method of claim 3 wherein the step of securing an inflator retainer comprises attaching a first portion of the inflator retainer to a second portion of the inflator retainer, thereby aligning a flange on the first portion with a flange on the second portion for securing a portion of an airbag therebetween.

5. The method of claim 3 wherein the step of positioning two modular housing plates comprises providing upper and lower plates, each having a plurality of integral hooks projecting from a face.

6. The method of claim 3 further comprising the step of providing a plurality of mounting tabs on the housing body for engagement with a structural member of a vehicle.

7. The method of claim 6 wherein the step of providing a plurality of mounting tabs further comprises providing a plurality of mounting tabs formed integrally with the components of the housing body.

8. The method of claim 6 wherein the step of providing a plurality of mounting tabs is characterized by providing a plurality of mounting tab members welded to the housing body.

9. The method of claim 6 wherein the step of providing a plurality of mounting tabs comprises locating at least two tabs at opposite ends of the housing.

10. The method of claim 6 wherein the step of providing a plurality of mounting tabs comprises locating the tabs on an upper and a lower housing plate.

11. An airbag housing manufactured by a process comprising the steps of:

positioning a set of end housing plates substantially parallel to each other;

positioning a set of side housing plates substantially parallel to one another, and substantially perpendicular to the set of end housing plates;

attaching the sets of end and side housing plates directly to one another so that said side housing plates are relatively fixed with respect to said end housing plates, thereby forming a walled housing body having an interior space;

positioning an airbag inflator at least partially in the interior space and securing the inflator to the walled housing body;

attaching a first hook plate having a plurality of hook members to one of the side housing plates, wherein the housing plate is an upper plate and the plurality of hook members are positioned to protrude through a plurality of matching apertures in the upper plate; and attaching a second hook plate having a plurality of hook members to a second of the side housing plates, wherein the second housing plate is a lower plate and the plurality of hook members are positioned to protrude through a plurality of matching apertures in the lower plate, wherein at least one of the set of end and side housing plates is modular, the modular set being adapted to accommodate varying dimensions of the other set.

12. An airbag housing manufactured by the process of claim 11, wherein the step of positioning an airbag inflator comprises:

providing an inflator housing unit having a first portion and a second portion, the second portion having a plurality of inflation apertures; and affixing the inflator housing unit to at least one of the housing plates such that the plurality of inflation apertures are oriented toward the interior space of the housing body, said inflation apertures oriented to supply inflation fluid between an interior of said inflator housing unit and an airbag attachable thereto.

13. An airbag housing manufactured by the process of claim 11 wherein the process further comprises the step of:

providing a plurality of mounting tabs on the housing body for securing the housing body to at least one vehicle structural member.

14. An airbag housing manufactured by the process of claim 13 wherein the step of providing a plurality of mounting tabs is further characterized by positioning the plurality of mounting tabs on the modular housing end plates.

15. An airbag housing manufactured by the process of claim 13 wherein the step of providing a plurality of mounting tabs is further characterized by positioning the plurality of mounting tabs on the modular housing side plates.

16. An airbag housing comprising:

a plurality of substantially planar housing members directly attachable to one another so as to form a substantially rectangular housing body with said plurality of substantially planar housing members relatively fixed with respect to one another;

an inflator retainer attached to said housing body, said retainer having a first half and a second half, each said half having a retaining surface and a flange projecting from an outer surface;

a first hook plate having a plurality of hook members, the first hook plate being attached to one of the housing members, wherein the housing member is an upper plate and the plurality of hook members are positioned to protrude through a plurality of matching apertures in the upper plate; and a second hook plate having a plurality of hook members, the second hook plate being attached to a second of the housing members, wherein the second housing member is a lower plate and the plurality of hook members are positioned to protrude through a plurality of matching apertures in the lower plate, wherein said first half and said second half are securable to form a hollow retainer body whereby said retaining surfaces are substantially opposed to secure an inflator therebetween and said flanges are substantially flush to secure a portion of an airbag therebetween.

17. The airbag housing of claim 16 wherein said retaining surfaces are substantially arcuate.

18. The airbag housing of claim 16 wherein said inflator housing includes a plurality of inflation apertures oriented to fluidly connect an interior of said hollow retainer body with an interior of an airbag attached thereto.

* * * * *